June 22, 1943.　　　H. S. POLIN　　　2,322,703
ALARM INDICATOR
Filed Aug. 10, 1939
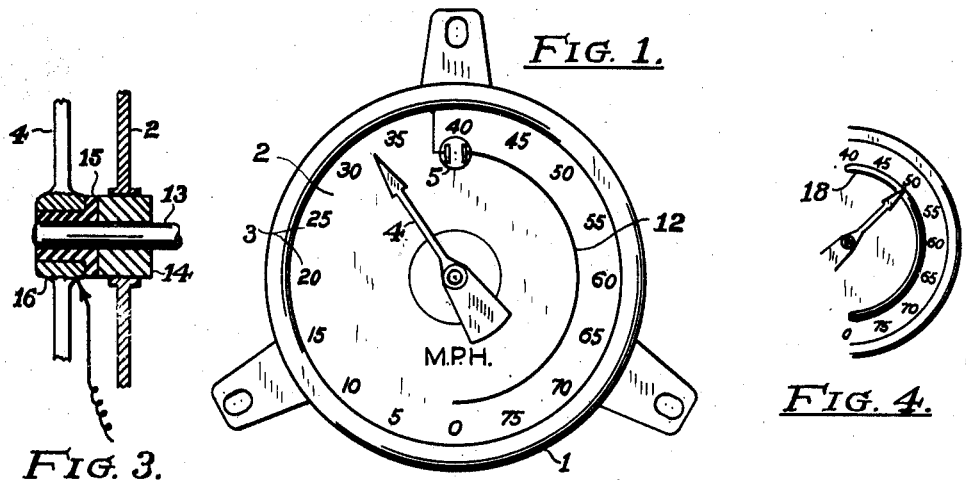
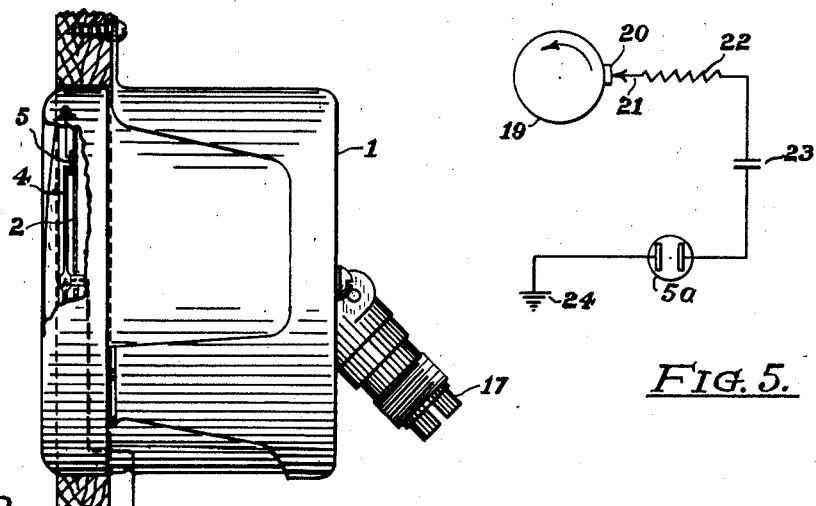
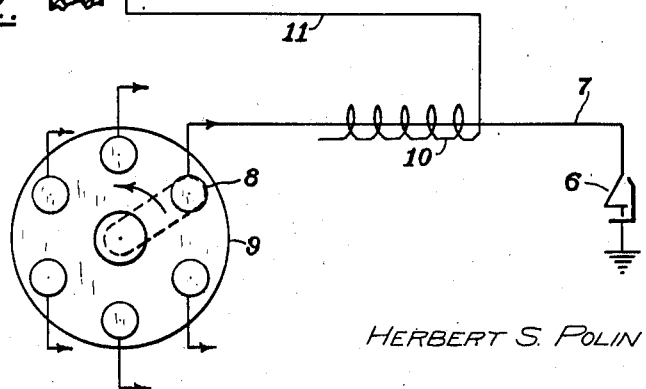
HERBERT S. POLIN INVENTOR.
BY William F. Nickel
ATTORNEYS.

Patented June 22, 1943

2,322,703

UNITED STATES PATENT OFFICE 2,322,703

ALARM INDICATOR

Herbert S. Polin, New York, N. Y., assignor of one-half to Harry A. Furman, Schenectady, N. Y.

Application August 10, 1939, Serial No. 289,349

3 Claims. (Cl. 177—311)

This invention relates to improvements in alarm indicators; and more particularly to apparatus to be associated with the speed-measuring instrument of a motor vehicle, and designed to give a warning signal as soon as a speed in excess of a predetermined limit is reached.

The object of the invention is to provide a device of this kind which comprises a lamp or glow element normally not illuminated, but so disposed that it is electrically energized and caused to emit rays of light, whenever the vehicle is propelled at a rate beyond the speed selected and the speed-measuring device is actuated accordingly; and a further object of the invention is to provide in connection with such apparatus a glow element which will radiate light of sufficient intensity to make it noticeable by both night and day, so that it can never escape the attention of the operator or fail to remind him that he is travelling at a rate higher than safety permits.

Another object of the invention is to provide a device of this kind which is electrically operated, but so arranged that it creates no demand for more power, and consumes no power in addition to what is ordinarily generated in connection with the propelling motor or engine of the vehicle.

An additional object of the invention is to provide a device of this kind which is inexpensive and requires but little extra material, and which will infallibly operate under the required conditions without interfering with the normal operation of the speed-measuring device, or necessitating any modification or alteration of the essential structure thereof.

The advantages and merits of the improvement will fully appear in the following description taken with the accompanying drawing, on which several embodiments of the invention are illustrated; and the novel features are clearly defined in the appended claims. But the disclosure is explanatory only, and changes may be made in practice regarding the shape, size, and arrangement of the parts without exceeding the scope and principle of the invention.

On said drawing:

Figure 1 is a front view of a speedometer for an automobile or other vehicle, indicating how my invention is attached, so that a warning signal is given whenever the moving index member of the speedometer indicates an unsafe speed.

Figure 2 is a side view of such a speedometer with part of the casing broken away to indicate the arrangement of some of the elements of the invention; also disclosing the electrical connections to part of the electrical power system of the vehicle.

Figure 3 is a view of a detail showing some of the connections for the apparatus used in the practice of this invention.

Figure 4 shows a modification of some parts of the invention associated with the speedometer, and Figure 5 shows another circuit controlled by a part of the speedometer for giving the same results.

In the drawing, the same numerals identify the same parts throughout.

At 1 I show the casing of an ordinary speedometer employed on automobiles and the like propelled by internal combustion engines or any other suitable mechanism. This speedometer has the usual dial 2 bearing numerals 3 thereon, representing speed in miles per hour or in any other rate; and 4 is the movable index pointer connected to the parts of the speedometer so that it turns; and its proximity to a number on the dial indicates the speed at which the car is travelling. The speedometer is mounted in the usual position on the instrument-board of the vehicle in front of the driver's seat, so that it can easily be seen by him. When the index pointer reaches a predetermined position, a glow element 5 will be illuminated, and give the driver warning that too high a speed has been attained. This glow element 5 is conveniently placed adjacent to one of the numerals 3, such as the numeral 40, which shows a speed of 40 miles an hour when the index 4 approaches it; and the glow element 5 is preferably a small neon tube suitably supported either on the inside surface of the glass of the dial 3, or on the surface of the dial itself, or in any other suitable manner.

The index member 4 is connected to a source of high-tension current so that when it approaches the dial number nearest the lamp, the latter will glow as it always does when it is subjected to radiation from a high-tension electrical current. But if the pointer 4 is in such position that its end is near to one of the other numerals indicating a lower speed, the neon tube 5 will emanate no light, and therefore attract no attention.

To supply high-tension current to energize the glow element 5, I utilize one of the high-tension ignition leads of the engine of the vehicle. The number 6 indicates an ordinary spark plug connected by a high-tension cable 7 to one of the terminals 8 of the conventional distributor 9. A part of this cable will be encircled by a few turns of wire constituting a pick-up coil 10, and one end of this pick-up coil will be united by conductor 11 to the index pointer 4, which of course is of metal or has metal extending from the hub to the point. This conductor may be lead into the casing 1 through a suitable aperture, and it is obvious that when the car is in motion and the spark-plugs are working, a sufficiently high voltage will be induced in the coil 10 to produce a radiation of the required value from the member 4. Hence, if the neon tube 5 is so placed with reference to the numerals 3 of the speedometer that it is in proximity to a numeral indicating the limiting speed, then whenever the index member 4 approaches that numeral, the neon tube will glow, and the necessary warning will be given.

It is now apparent that no extra material except a few feet of wire and a small neon lamp is required for my invention, and no additional demands are made upon the electrical power system of the vehicle. When the neon tube 5 glows, it will be bright enough to attract the driver's eye either by day or by night, but it will glow only when a dangerous speed is reached. The element 5 will not burn out, and its life-period is virtually as great as that of the car. As long as the unsafe speed is maintained, the tube 5 will be illuminated, and if the index member 4 moves beyond the element 5, the latter can be made to continue to glow by having it connected with a conductor strip 12, which may be a piece of wire or a strip of foil affixed to the face of the dial or the underface of the glass, as indicated in Figure 1. This conductor will be attached to one element of the neon tube, and this tube may be grounded or not as required.

Figure 3 shows the manner in which the index member 4 may be attached and operated to receive current from the lead 11. The shaft which supports and actuates this index member is illustrated at 13 in a bearing 14 suitably supported at the center of the dial 2. On the outer end of the shaft 13 is a flanged bushing 15 of some insulating material on which the hub 16 of the index member 4 is received. This hub is thus disconnected electrically from any part of the engine, and may be attached to the lead 11 by connecting it to a leaf spring supported in a fixed position and arranged to rub on the hub 16 and thus preserve connection between the wire 11 and the index member 4. Any other mode of connecting the wire 11 to the index member 4 may be employed. Sometimes the wire 11 may be connected to the flexible shaft that operates the speedometer and is united to the coupling indicated at 17 in Figure 2. In that event, the index member 4 will again have to be electrically insulated, or the speedometer must be insulated from all metal parts of the automobile. In such circumstances, a small section of insulation may be inserted in the line of the flexible shaft near the casing 1, with the wire 11 united to the flexible shaft between this section and the member 4.

I also may make the glow element 5 in the form of a curved piece of tubing as shown at 18 in Figure 4, with one end of this curved piece adjacent the numeral which indicates the beginning of dangerous speed. From this point the tube will follow the line or row of the succeeding higher numerals, so that the tube will continue to glow as the speed is increased.

Figure 5 shows another embodiment of the invention in which a rotatable element 19, as for example the flywheel of the speedometer, which will carry a moving contact segment 20 such as a piece of metal or foil. This contact will rub frictionally upon a fixed brush 21 in circuit with a resistance 22. From the other end of this resistance leads a wire to a condenser 23, and joined to the opposite pole of the condenser is a neon glow element 5a, the other pole of which is grounded as shown in 24. As the fly-wheel 19 rotates, static electricity will be generated by the contact 20 rubbing against the brush 21, and the parts may be so designed that when a safe speed is exceeded, the condenser 23 will discharge through the glow element 5a and illuminate it. The action may be suitably controlled, of course, by selecting a proper value for the resistance 22 and the proper capacity for the condenser 23.

From the foregoing, it will be seen that the invention can be incorporated with any ordinary speedometer, and connected to derive the electrical energy necessary to operate it from any one of the spark-plug leads. It is simple and efficient, and requires only a suitable neon glow tube and a few feet of wire or the like to make the connections. It is also certain in operation, because the neon tube will glow whenever the limiting speed is reached, but will emit no light at other times. It will always be bright enough to be seen by the operator; and it is decidedly superior to any arrangement in which an electric light is caused to burn continuously but is ordinarily hidden from the eye as by a shutter, and revealed only when the vehicle is going too fast by some means for automatically moving the shutter aside. Such a lamp must be kept lighted all the time, and sooner or later will burn out and become useless. It will then give the driver no indication, and the latter may fail to notice that the lamp bulb is destroyed, so that an accident may ensue. Even if such a lamp bulb is replaced at once, a considerable amount of manipulation is necessary. In contrast with such a device, the neon tube glows only when an unsafe speed is reached, is never likely to burn out, and will endure as long as any other part of the car which carries it.

Having described my invention, what I claim to be new and worthy of protection by Letters Patent is:

1. The combination of a measuring instrument, a glow discharge lamp adjacent the face thereof, said instrument having an index member, a source of high-tension electric energy connected to said member, and a conductor attached to said glow discharge lamp to preserve the operative relation thereof with the index member when the latter moves past said lamp.

2. The combination of a measuring device having a movable index member, a glow discharge lamp supported along a selected path adjacent a portion of the path over which said member moves, and means for impressing high-tension electric energy on said member, so that when said member reaches a point giving a pre-determined indication, or passes beyond said point, said element will be illuminated.

3. In combination, a measuring instrument having a movable index member and a cooperating graduated dial, a source of high-tension electric energy connected to said member, a path extending along a portion of said dial, said path being sufficiently conductive to effectively carry some of such high-tension electric energy when the index member is in positions close to said path, and said path including a glow discharge lamp, whereby said lamp is lighted whenever the index member is in said positions.

HERBERT S. POLIN.